United States Patent
Liao et al.

(10) Patent No.: US 9,769,501 B2
(45) Date of Patent: Sep. 19, 2017

(54) VIDEO QUALITY ASSESSMENT AT A BITSTREAM LEVEL

(75) Inventors: Ning Liao, Beijing (CN); Zhibo Chen, Beijing (CN); Kai Xie, Beijing (CN)

(73) Assignee: THOMSON Licensing, Issy-les-Moulineaux (FR)

( * ) Notice: Subject to any disclaimer, the term of this patent is extended or adjusted under 35 U.S.C. 154(b) by 290 days.

(21) Appl. No.: 14/405,079

(22) PCT Filed: Jul. 17, 2012

(86) PCT No.: PCT/CN2012/078766
§ 371 (c)(1),
(2), (4) Date: Dec. 2, 2014

(87) PCT Pub. No.: WO2014/012219
PCT Pub. Date: Jan. 23, 2014

(65) Prior Publication Data
US 2015/0222932 A1    Aug. 6, 2015

(51) Int. Cl.
*H04N 19/895* (2014.01)
*H04N 19/44* (2014.01)
(Continued)

(52) U.S. Cl.
CPC ......... *H04N 19/895* (2014.11); *H04N 17/004* (2013.01); *H04N 19/139* (2014.11);
(Continued)

(58) Field of Classification Search
None
See application file for complete search history.

(56) References Cited

U.S. PATENT DOCUMENTS 6,636,565 B1 * 10/2003 Kim ............... H04N 19/50 375/240.27
8,798,145 B2    8/2014 Li et al.
(Continued)

FOREIGN PATENT DOCUMENTS

CN    101213846    7/2008
CN    101326833    12/2008
(Continued)

OTHER PUBLICATIONS

Lin et al: "A Versatile Model for Packet Loss Visibility and ist Application to Packet Prioritization";IEEE Transactions on Image Processing, IEEE Service Center, Piscataway, NJ, US;vol. 19, No. 3, Mar. 1, 2010, pp. 722-735, ISSN: 1057-7149;DOI: 10.1109/TIP.2009.2038834.

*Primary Examiner* — Mohammad J Rahman
(74) *Attorney, Agent, or Firm* — Brian J. Dorini; Xiaoan Lu (57) ABSTRACT

A macroblock in a video sequence may be undecodable because the corresponding compressed data is lost or the syntax is out of synchronization. An undecodable macroblock may be concealed using error concealment technique. The level of initial visible artifacts caused by undecodable macroblocks may be estimated as a function of motion magnitude, error concealment distance, and/or residual energy. The initial visible artifacts may propagate spatially or temporally to other macroblocks through prediction. Considering both initial visible artifacts and propagated artifacts, levels of overall artifacts may be estimated for individual macroblocks. The visual quality for the video sequence can then be estimated by pooling the macroblock level artifact levels.

16 Claims, 2 Drawing Sheets

(51) Int. Cl.
*H04N 19/184* (2014.01)
*H04N 19/139* (2014.01)
*H04N 19/177* (2014.01)
*H04N 17/00* (2006.01)
*H04N 19/86* (2014.01)
*H04N 19/89* (2014.01)
*H04N 19/154* (2014.01)

(52) U.S. Cl.
CPC ......... *H04N 19/177* (2014.11); *H04N 19/184* (2014.11); *H04N 19/44* (2014.11); *H04N 19/86* (2014.11); *H04N 19/154* (2014.11); *H04N 19/89* (2014.11)

(56) References Cited

U.S. PATENT DOCUMENTS

| | | | |
|---|---|---|---|
| 9,210,447 B2 | 12/2015 | Bandyopadhyay et al. | |
| 2003/0081124 A1 | 5/2003 | Balasubrawmanian et al. | |
| 2006/0104366 A1* | 5/2006 | Huang | H04N 19/147 375/240.27 |
| 2006/0192850 A1* | 8/2006 | Verhaegh | H04L 12/2854 348/14.12 |
| 2006/0269153 A1* | 11/2006 | Shi | H04N 19/56 382/236 |
| 2007/0074266 A1* | 3/2007 | Raveendran | H04N 5/144 725/135 |
| 2007/0206673 A1* | 9/2007 | Cipolli | H04L 1/1607 375/240.1 |
| 2007/0237098 A1 | 10/2007 | Wang | |
| 2008/0152245 A1* | 6/2008 | El-Maleh | H04N 21/4621 382/254 |
| 2009/0148058 A1* | 6/2009 | Dane | H04N 5/145 382/251 |
| 2009/0213938 A1* | 8/2009 | Lee | H04N 19/70 375/240.24 |
| 2009/0300692 A1* | 12/2009 | Mavlankar | H04N 21/234318 725/94 |
| 2010/0053335 A1 | 3/2010 | Hong et al. | |
| 2010/0166071 A1* | 7/2010 | Wu | H04N 19/139 375/240.16 |
| 2010/0260269 A1* | 10/2010 | He | H04N 19/159 375/240.27 |
| 2011/0090960 A1* | 4/2011 | Leontaris | H04N 19/103 375/240.12 |
| 2011/0141289 A1 | 6/2011 | Lee et al. | |
| 2011/0206298 A1 | 8/2011 | Mueller et al. | |
| 2012/0033741 A1* | 2/2012 | Nassor | H03M 7/3057 375/240.25 |
| 2012/0079329 A1* | 3/2012 | Steinbach | H04N 19/176 714/704 |
| 2014/0286441 A1* | 9/2014 | Zhang | H04N 17/004 375/240.27 |
| 2015/0365662 A1* | 12/2015 | Liao | H04N 19/115 382/275 |
| 2015/0373324 A1* | 12/2015 | Liao | H04N 17/004 382/275 |

FOREIGN PATENT DOCUMENTS

| | | |
|---|---|---|
| CN | 102106146 | 6/2011 |
| JP | 2007527664 | 9/2007 |
| JP | 2008301026 | 12/2008 |
| WO | WO2012076203 | 6/2012 |
| WO | WO2013075318 | 5/2013 |

* cited by examiner

VIDEO QUALITY ASSESSMENT AT A BITSTREAM LEVEL

This application claims the benefit, under 35 U.S.C. §365 of International Application PCT/US2012/078766, filed 17 Jul. 2012, which was published in accordance with PCT Article 21(2) on 23 Jan. 2014 in English.

TECHNICAL FIELD

This invention relates to video quality measurement, and more particularly, to a method and apparatus for determining an objective video quality metric.

BACKGROUND

With the development of IP networks, video communication over wired and wireless IP networks (for example, IPTV service) has become popular. Unlike traditional video transmission over cable networks, video delivery over IP networks is less reliable. Consequently, in addition to the quality loss from video compression, the video quality is further degraded when a video is transmitted through IP networks. A successful video quality modeling tool needs to rate the quality degradation caused by network transmission impairment (for example, packet losses, transmission delays, and transmission jitters), in addition to quality degradation caused by video compression.

SUMMARY

The present principles provide a method for estimating visual quality of a video sequence represented by a bitstream, wherein slicing mode error concealment is used to conceal undecodable blocks in the video sequence, comprising the steps of: estimating a motion magnitude of a block, in a frame of the video sequence, that is undecodable; determining a distance between the frame and another frame that is used to conceal the block; and estimating the visual quality of the video sequence in response to the motion magnitude and the distance as described below. The present principles also provide an apparatus for performing these steps.

The present principles also provide a method for estimating visual quality of a video sequence represented by a bitstream, wherein slicing mode error concealment is used to conceal undecodable blocks in the video sequence, comprising the steps of: estimating a motion magnitude of a block, in a frame of the video sequence, that is undecodable; determining a distance between the frame and another frame that is used to conceal the block; determining an initial visible artifact level in response to the motion magnitude and the distance; determining a propagated visible artifact level for a pixel in the block in response to an artifact level for a pixel in another block that is used as a reference block for the block; determining an artifact level for the pixel in the block in response to the initial visible artifact level for the block and the propagate visible artifact level for the pixel in the block; and estimating an overall visible artifact level for the block in response to the artifact level for the pixel in the block, wherein the visual quality of the video sequence is estimated in response to the overall visible artifact level for the block as described below. The present principles also provide an apparatus for performing these steps.

The present principles also provide a computer readable storage medium having stored thereon instructions for estimating visual quality of a video sequence represented by a bitstream, wherein slicing mode error concealment is used to conceal undecodable blocks in the video sequence, according to the methods described above.

DETAILED DESCRIPTION

A video quality measurement tool may operate at different levels. For example, the tool may take the received bitstream and measure the video quality without reconstructing the video. Such a method is usually referred to as bitstream level video quality measurement. When extra computational complexity is allowed, the video quality measurement may reconstruct some or all images from the bitstream and use the reconstructed images to more accurately estimate video quality.

The present principles relate to objective video quality models that assess video quality at a bitstream level, without reconstructing videos.

Most existing video compression standards, for example, H.264 and MPEG-2, use a macroblock as the basic encoding unit. Thus, the following embodiments use a macroblock as the basic processing unit. However, the principles may be adapted to use a block at a different size, for example, an 8×8 block, a 16×8 block, a 32×32 block, or a 64×64 block.

When some portions of the video are not decoded properly, error concealment techniques, for example, slicing mode error concealment and freezing mode error concealment may be used to conceal decoded videos.

In a slicing mode error concealment technique, when some data corresponding to a frame is lost, a decoder attempts to repair the lost macroblocks using the pixels that are already reconstructed. Visible artifacts may remain in the picture after the repair, and they may propagate to subsequent pictures that use concealed macroblocks as references.

In a freezing mode error concealment technique, when some data corresponding to a reference frame, for example, an I, P, or reference B frame, is lost, the decoder freezes decoding and repeats the previous correctly decoded frame until a frame without referring (directly or indirectly) to the lost frame is correctly received. When a non-reference frame; for example, a non-reference B frame has data loss, the decoder only freezes decoding for the lost frame since subsequent frames can be decoded without referring to the non-reference frame. The freezing mode error concealment may reflect the worst perceptual quality that can be obtained by any error concealment strategies.

When some portions of the coded video bitstream are lost during network transmission, macroblocks corresponding to the lost portions are denoted as lost macroblocks and they are undecodable. Some macroblocks, even if correctly received, may also become undecodable, for example, because the syntax for the macroblock is out of synchronization. Undecodable macroblocks, either because the corresponding compressed data are lost or the syntax is out of synchronization, are denoted as EC MBs. Decodable macroblocks as denoted as non-EC MBs.

In a slicing mode error concealment technique, the non-EC MBs may be decoded, and the EC MBs may be concealed, for example, using pixels of collocated macroblocks from a previously decoded frame. An error concealment distance, denoted as ED, is defined as a distance, in a display order, between the to-be-concealed frame and the concealing frame (i.e., the frame used for error concealment). Note the distance between two frames may be calculated as the time interval or time difference between two frames, or the number of frames between two frames. The error concealment distance parameter depends on which error concealment technique is used. If the error concealment technique is unknown, the error concealment distance may be set to the distance between the to-be-concealed frame and the immediately previous decoded frame.

Generally, the goal of error concealment is to estimate EC MBs in order to minimize perceptual quality degradation. The perceived strength of artifacts produced by transmission errors depends heavily on the employed error concealment techniques. For example, if a frame far away from a current frame is used to conceal a current macroblock, the concealed macroblock is more likely to have visible artifacts. In addition, the artifact strength is also related to the video content. For example, a slow moving video is easier to be concealed. Thus, parameters, such as motion vectors and error concealment distance, can be used to assess the error concealment effectiveness and the quality of concealed video at a bitstream level.

For a given motion vector ($MV_x$, $MV_y$), its motion magnitude (MV) is used to measure how large the motion is. In one example, it can be calculated as:

$$MV=\sqrt{MV_X^2+MV_Y^2}. \quad (1)$$

It can also be calculated in other forms, for example, as:

$$MV=|MV_X|+|MV_Y|. \quad (2)$$

Residual information results from motion-compensated prediction. It is observed that the energy of residual information (also referred to as residual energy, RSD) of a macroblock reflects the texture complexity and motion complexity of the macroblock.

In smooth areas of some video sequences, for example, in sky and grassland which are usually easy to be concealed, the estimated motion vectors may be large even the movement between pictures are small. Consequently, a video quality measurement based on motion vectors may falsely estimate strong visible artifacts even though the concealed areas have good visual quality. By contrast, the residual energy in the smooth areas may be relatively small and may provide better indication about the perceived visual quality. Thus, residual energy can be used as another parameter in estimating the artifact level.

In one embodiment, the residual energy of a non-EC MB can be calculated as the sum of energy of de-quantized transform coefficients, or as the sum of energy of de-quantized AC transform coefficients. The residual energy of an EC MB can be set to that of a collocated macroblock in a previous reference frame.

Note that the residual energy, as well as motion magnitude and error concealment distance, can be derived without reconstructing the video. That is, there parameters can be derived at a bitstream level.

As discussed above, visual artifacts may still be perceived after error concealment. The visual artifacts may occur at an EC MB because error concealment may be not effective therein. Such visual artifacts caused by undecodable macroblocks are denoted as initial visible artifacts. If a block having initial visible artifacts is used as a reference, for example, for intra prediction or inter prediction, the initial visible artifacts may propagate spatially or temporally to other macroblocks in the same or other frames through prediction. Such propagated artifacts are denoted as propagated visible artifacts. The overall artifacts, caused by initial and/or propagated visible artifacts, are denoted as overall visible artifacts.

The present principles are directed to visual quality measurement when the slicing mode error concealment is used. The artifacts caused by slicing mode may be considered jointly with artifacts caused by freezing mode error concealment or other error concealment techniques.

Figure 1:
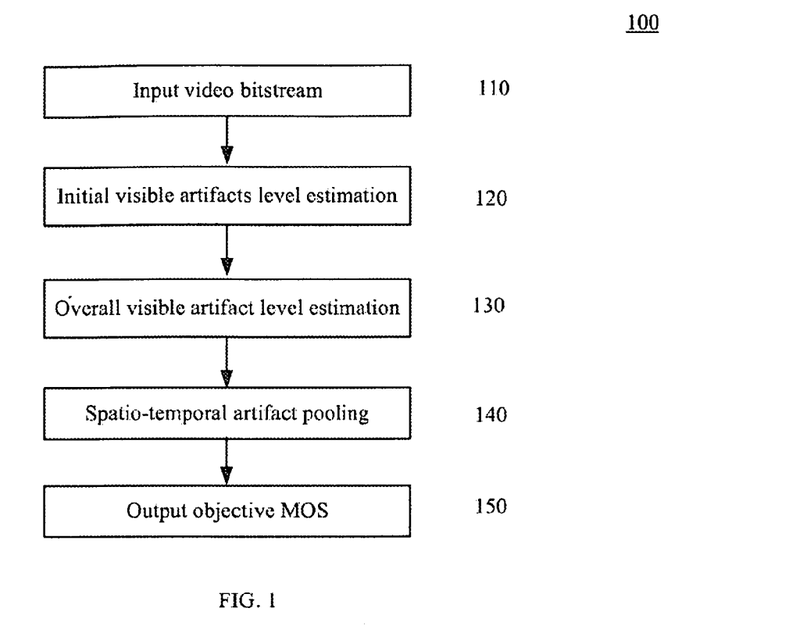
FIG. 1 is a flow diagram depicting an example of video quality modeling, in accordance with an embodiment of the present principles.

An exemplary video quality modeling method 100 is shown in FIG. 1. In method 100, a video bitstream is input at step 110 and the objective quality of the video sequence corresponding to the bitstream will be estimated. At step 120, initial visible artifact levels are estimated for individual macroblocks. The level of the initial visible artifact may be estimated from the artifact type, frame type and other frame level or macroblock level features obtained from the bitstream. At step 130, both initial and propagated visible artifacts are considered to estimate an overall visible artifact level for individual macroblocks. At step 140, a spatio-temporal artifact pooling algorithm may be used to convert artifacts at a macroblock level into one objective MOS (Mean Opinion Score), which estimates the overall visual quality of the video sequence corresponding to the input bitstream. During spatio-temporal pooling, other artifact types may be considered, and the property of human visual system may be considered to more accurately estimate the MOS score. At step 150, the estimated MOS is output.

Figure 2:
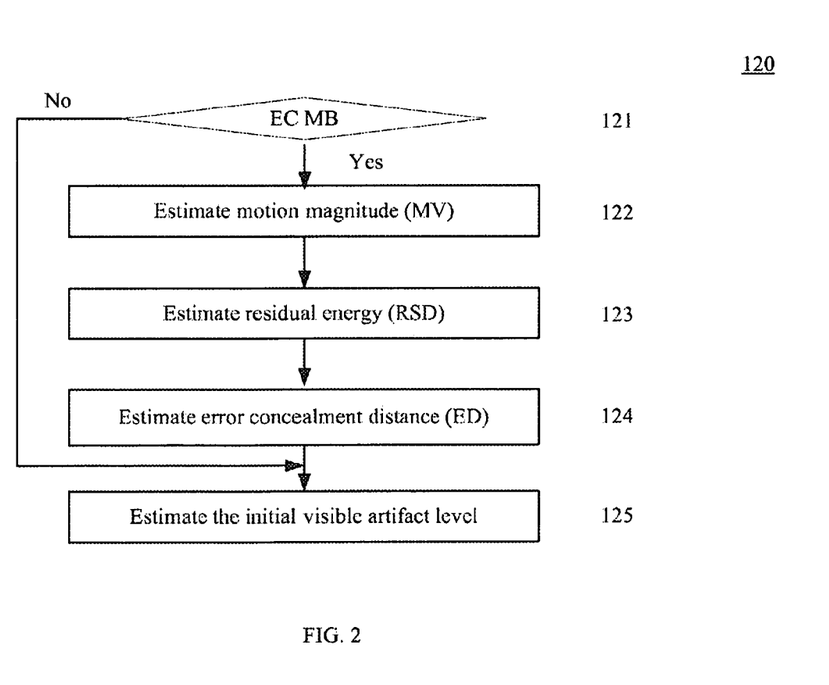
FIG. 2 is a flow diagram depicting an example of estimating initial visible artifact level, in accordance with an embodiment of the present principles.

The initial visible artifact level estimation (120) may be performed using an exemplary method as shown in FIG. 2. To estimate the initial visible artifact level, it checks whether a macroblock is an EC MB at step 121. If the macroblock is not an EC MB, the initial visible artifact level is set to a constant value, for example, 0, to indicate that no initial visible artifact is present. Otherwise, at steps 122, 123, and 124, parameters for an EC MB, for example, motion magnitude (MV), residual energy (RSD), and error concealment distance (ED), are estimated. The parameters may be estimated in a different order from what is shown in FIG. 2. In some applications, for example, in a high bitrate application, only a subset of the parameters needs to be estimated. Using the estimated parameters, the initial visible artifact level is estimated for the EC MB at step 125.

Whether an application is considered as a high bitrate application or low bitrate application depends on the video resolution, video compression standard in use, and the target application. For example, as defined in ITU-T P.NBAMS (Non-intrusive bitstream model for the assessment of performance of video streaming) test plan, bitrates are chosen for the mobile application and IPTV application as follows:

MPEG4 and H.264 for mobile application:
QCIF: 32-256 kbps (very high bitrate: 1.5 Mbps)
QVGA: 100-768 kbps (very high bitrate: 3.5 Mbps)
HVGA: 150-2000 kbps (very high bitrate: 6 Mbps)

MPEG2 for IPTV application:
SD (PAL (576i) and NTSC (480i)): 2-16 Mbps
H.264 for IPTV application:
1080i/p: 1-15 Mbps (very high bitrate: 30 Mbps)
720p: 0.5-15 Mbps (very high bitrate: 30 Mbps)
SD (PAL and NTSC): 0.5-9 Mbps (very high bitrate: 9 Mbps)

In particular, for ITU-T P.NBAMS, IPTV applications using SD or HD (720p and 1080i/p) resolutions are considered as high bitrate applications, and mobile applications using HVGA or smaller (e.g., QVGA, QCIF) resolutions are considered as low bitrate applications.

In the following, the steps of determining motion magnitude (122), estimating the initial visible artifact level (125), and estimating overall visible artifact level (130) for a macroblock are discussed in further detail.

Motion Magnitude (MV)

Since an EC MB is undecodable, the motion vector and residual information of the EC MB are not available directly from the bitstream, and thus, the motion magnitude and residual energy need to be estimated.

Figure 3A:
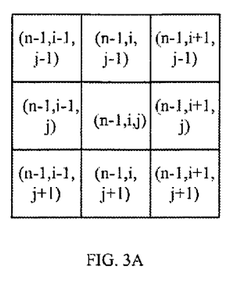
FIGS. 3A, 3B, and 3C are pictorial examples depicting macroblocks (MBs) in frames n−1, n, and n+1.
Figure 3B:
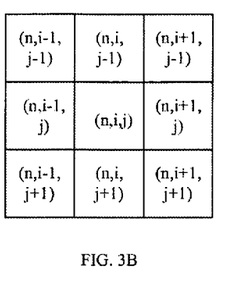
Figure 3C:
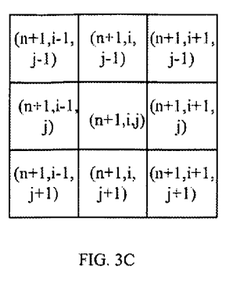

FIG. 3B shows a portion of a current video frame n with an MB (n,i,j) and its eight neighboring macroblocks. FIG. 3A shows the same portion of a previous video frame n−1, and FIG. 3C of a subsequent video frame n+1.

The estimation of motion magnitude for a macroblock depends on the frame type of a frame that the macroblock belongs to. If the EC MB is in an Intra frame, the motion magnitude of the EC MB may be set to the motion magnitude of a collocated macroblock in the closest decoded reference frame. That is, when frame n is an Intra frame, the motion vector for EC MB (n,i,j) is estimated as:

$$MV(n,i,j)=MV(n-k,i,j), \quad (3)$$

wherein frame n−k is the closest reference frame.

If an EC MB is in a non-Intra frame (for example, a B or P frame), a median value of the available motion vectors of its four immediate adjacent neighbors may be used to estimate the motion vector of the EC MB and to calculate motion magnitude. The term "available motion vector" means that the corresponding macroblock is correctly decoded and is an inter-predicted macroblock. Thus, when frame n is a non-Intra frame and motion vectors of all four immediate neighboring macroblocks are available, the motion vector for EC MB (n,i,j) can be estimated as:

$$MV(n,i,j)=\text{median}(MV(n,i,j-1),MV(n,i,j+1),MV(n,i-1,j),MV(n,i+1,j)). \quad (4)$$

If a macroblock of a non-Intra frame has no available neighboring motion vectors, the above motion magnitude as described in Eq. (4) cannot be used and the motion magnitude needs to be estimated in a different manner. In one exemplary embodiment, if the macroblock is correctly decoded and is an intra macroblock, then its motion vector is set to zero. Otherwise, motion vectors of the macroblocks at slice boundaries are set to that of the spatially closest macroblock, and motion vectors of internal macroblocks in a slice are set to that of a previous reference frame. For example, if the frame is coded with one MB-row per slice, the motion vector of a macroblock is set to that of the spatially nearest upper macroblock. If the frame is coded with one frame per slice, the motion vector of a macroblock is set to that of the collocated macroblock in a previous reference frame, wherein the previous reference frame is defined as the closest previously decoded reference frame in a display order.

TABLE 1 a. MB(n,i,j) has available neighboring motion vectors
  MV(n,i,j) = median(available neighboring motion vectors)
b. MB(n,i,j) is intra and has no available neighboring motion vectors
  MV(n,i,j) = 0
c. otherwise (MB(n,i,j) is non-intra and has no available neighboring motion vectors)
  c.1. the frame is encoded at one macroblock-row/slice
    c.1.i MB(n,i,j) is in the first macroblock row
      MV(n,i,j) = 0
    c.1.ii otherwise
      MV(n,i,j) = MV of the upper macroblock
  c.2. one frame/slice
    MV(n,i,j)= MV of collocated MB in a previous reference frame
  c.3. otherwise (a slice has more than one macroblock-row but less than a frame)
    c.3.i. MB(n,i,j) is boundary macroblock
      MV(n,i,j) = MV of spatially closest macroblock
    c.3.ii. MB(n,i,j) is an internal macroblock
      MV(n,i,j) = MV of collocated MB in a previous reference frame In TABLE 1, exemplary pseudo code is provided to illustrate how the motion vector for an EC MB in a non-intra frame can be derived.

For a non-EC macroblock, the motion vector is available. However, to avoid abnormal motion vector, a median value of available motion vectors of its four immediate adjacent macroblocks and itself may be calculated as a refined motion vector for the macroblock, which may be used by a collocated EC MB of a later frame. Thus, when frame n is a non-Intra frame and motion vectors of four immediate neighboring macroblocks are available, a refined motion vector for non-EC MB (n,i,j) may be estimated as:

$$MV(n,i,j)=\text{median}(MV(n,i,j-1),MV(n,i,j+1),MV(n,i,j),MV(n,i-1,j),MV(n,i+1,j)). \quad (5)$$

In one implementation, we use the actual motion vector of the non-EC MB to calculate the motion magnitude for high bitrate applications, and use the refined motion vector for low bitrate applications.

The median operation in estimating or refining motion vectors is intended to avoid abnormal motion vector and to obtain an approximately true motion, because the motion vectors decoded from the compressed bitstream do not always reflect the true motion.

For the motion vector estimation discussed above, we assume there is one motion vector per macroblock. The methods can be easily extended where there are multiple motion vectors for a macroblock. For example, in H.264/AVC, a macroblock can be further partitioned into blocks or sub-blocks, and there may be various macroblock partition modes in an inter-predicted frame. In one embodiment, 16 motion vectors corresponding to 16 4×4 blocks of an inter-predicted macroblock are used to calculate the median value.

For an inter-predicted macroblock in a B frame, it may have different prediction directions or refer to different prediction lists. For example, a macroblock in a B-frame may use forward prediction only, backward prediction only, or bi-directional prediction. Macroblocks in one frame may also have different reference frames due to the use of multiple reference frames. Thus, to unify the meanings of motion vectors in B frames and P frames, we normalize the motion vectors with the reference direction and the distance between the current frame and the reference frame. When a reference frame is totally lost, the distance is calculated by inferring the display order, or a POC (Picture Order Count) value, of the lost reference frame. For example, for a block of an inter-predicted macroblock, its decoded MV can be normalized as:

$$MV_{norm} = \begin{cases} \dfrac{MV_0}{dist_0}, & \text{forward prediction mode} \\ \dfrac{MV_1}{dist_1}, & \text{backward prediction mode,} \\ \left(\dfrac{MV_0}{dist_0} - \dfrac{MV_1}{dist_1}\right)/2, & \text{bi-directional prediction mode} \end{cases} \quad (6)$$

where $MV_0$ and $MV_1$ are motion vectors for forward prediction and backward prediction, respectively, and $dist_0$ and $dist_1$ are the distances between the current frame and its forward reference frame and backward reference frame, respectively.

Initial Visible Artifact Level Estimation

As discussed before, for a non-EC MB of frame n, the initial artifacts visibility level $LoVA_{init}$ is set to a constant, for example, 0.

For an EC MB of a partially received frame, it is observed that the motion magnitude and the error concealment distance usually closely relate to the visible artifact levels. We observe that the product of MV and ED, MV×ED, often reflects the displacement of an object from the concealing frame to the current frame. Generally, the larger the value is, the more likely there are visible artifacts at the macroblock.

Thus, the initial artifacts visible level may be calculated as a function of motion magnitude and error concealment distance. In one example, $LoVA_{init}$ may be calculated as follows:

$$LoVA_{init}^{curr}(n,i,j) = \begin{cases} 0, & \text{non-}ECMB \\ f_1(MV_{norm_{ij}} \times ED), & ECMB \end{cases} \quad (7)$$

where $$f_1(x) = \begin{cases} v_1, & x < S_1 \\ \dfrac{(v_2 - v_1)}{S_2 - S_1} \times (x - S_1), & S_1 \leq x \leq S_2 \\ v_2, & x > S_2 \end{cases} \quad (8)$$

Note that MV in Eq. (7) may be normalized to be in the unit of pixel, while the motion vectors parsed from a bitstream may be in the unit of a fractional pixel, for example, in the unit of quarter-pel for an H.264/AVC compliant bitstream.

In another exemplary embodiment, we notice that the estimation of the initial artifact level may be adaptive to the bit rate or applications. For example, at a high bitrate application, using $f_1(MV_{norm_{ij}} \times ED)$ alone may already provide an accurate estimation. However, at a low bitrate application, the motion estimation is less accurate and $f_1(MV_{norm_{ij}} \times ED)$ alone does not always provide an accurate estimation. To improve the accuracy for a low bitrate application, the residual energy may be used. For example, for an EC MB, $LoVA_{init}$ may be calculated as follows:

$$LoVA_{init}^{curr}(n,i,j) = \quad (9)$$
$$\begin{cases} f_1(MV_{norm_{ij}} \times ED), & \text{high bit rate} \\ \min\{f_1(MV_{norm_{ij}} \times ED), f_2(RSD_{ij})\}, & \text{low bit rate} \end{cases},$$

where $$f_2(x) = \begin{cases} u_1, & x < T_1 \\ \dfrac{(u_2 - u_1)}{T_2 - T_1} \times (x - T_1), & T_1 \leq x \leq T_2 \\ u_2, & x > T_2 \end{cases} \quad (10)$$

Alternatively, min(.) function in Eq. (9) may be replaced by other functions, for example, by $c \times [f_1(MV_{norm_{ij}} \times ED)]^a \times [f_2(RSD_{ij})]^b$, where a, b, and c are constants.

For $f_1(x)$, the constants may be set as: $v_1=0$, $v_2=100$, $S_1=1$ pixels, and $S_2=8$ pixels on an artifact scale of 0~255. For $f_2(x)$, the constants may be set as: $u_1=0$, $u_2=100$, $T_1=1$ pixels, and $T_2=64$ on an artifact scale of 0~255. The constants may be adjusted, for example, to support various applications and other ranges of artifact scales.

When a reference frame is lost, a scalar average of all motion vectors of macroblock (n,i,j) is calculated and denoted as $MV_{mgnt}$. In another embodiment, the scalar average of motion vectors pointed to the lost reference frame is used to calculate $MV_{mgnt}$. When there is no corresponding motion vector for the macroblock, $MV_{mgnt}$ is set to zero. Using $MV_{mgnt}$, the initial artifact level may be calculated as:

$$LoVA_{init}^{ref}(n,i,j) = \min\{f_1(MV_{mgnt} \times ED), f_2(RSD_{ij})\}. \quad (11)$$

In another embodiment, spatialuniformMV, which may be calculated as follows, is used instead of $MV_{mgnt}$:

spatialuniformMV$_x(n,i,j)$=standardvariance{mv$_x(n,i-1,j-1)$,mv$_x(n,i,j-1)$,mv$_x(n,i+1,j-1)$,mv$_x(n,i-1,j)$, mv$_x(n,i+1,j)$,mv$_x(n,i-1,j+1)$,mv$_x(n,i,j+1)$,mv$_x(n,i+1,j+1)$}, spatialuniformMV$_y(n,i,j)$=standardvariance{mv$_y(n,i-1,j-1)$,mv$_y(n,i,j-1)$,mv$_y(n,i+1,j-1)$,mv$_y(n,i-1,j)$, mv$_y(n,i+1,j)$,mv$_y(n,i-1,j+1)$,mv$_y(n,i,j+1)$,mv$_y(n,i+1,j+1)$}.

$$\text{spatialuniformMV}(n,i,j) = \max(\text{spatialuniformMV}_x(n,i,j), \text{spatialuniformMV}_y(n,i,j)) \quad (12)$$

In yet another embodiment, we use $MV_{mgnt}$ for low bit rate applications, and spatialuniformMV for high bit rate applications.

When the reference frame is not lost, $LoVA_{init}^{ref}(n,i,j)$ is set to 0. Whether or not a reference frame is lost can be determined by parsing syntax elements received in a bitstream.

Considering both lost macroblocks in the current frame and the loss of reference frames, the initial visible artifact level may be calculated as:

$$LoVA_{init}(n,i,j) = \max\{LoVA_{init}^{curr}(n,i,j), LoVA_{init}^{ref}(n,i,j)\}. \quad (13)$$

When there are two reference picture lists, for example, forward prediction and backward prediction, the initial visible artifact level for a macroblock may be extended to:

$$LoVA_{init}(n,i,j) = \max\{LoVA_{init}^{curr}(n,i,j), LoVA_{init}^{ref0}(n,i,j), LoVA_{init}^{ref1}(n,i,j)\}, \quad (14)$$

where $LoVA_{init}^{ref0}$ and $LoVA_{init}^{ref1}$ correspond to different reference picture lists. The max(.) function in Eqs. (13) and (14) may be replaced by other functions, for example, by a weighted sum.

As discussed above, assuming that the motion field and prediction residual are temporally coherent, we may estimate motion vectors and residual energy of an EC MB from previous reference frames. However, this assumption may not hold when an EC MB occurs in a scene cut frame. In fact, if a packet loss occurs at a scene cut frame, a temporal error concealment method may not work properly and may produce strong visible artifacts. A method to assess visual quality when a packet loss occurs at a scene cut frame is disclosed at a commonly owned PCT application, entitled "Video Quality Assessment Considering Scene Cut Artifacts" by N. Liao, Z. Chen, F. Zhang, and K. Xie (PCT/CN2011/082955), the teachings of which are specifically incorporated herein by reference.

Overall Visible Artifact Level Estimation

Because of intra or inter prediction used in video compression, initial visible artifacts of EC MBs may propagate spatially and temporally to other macroblocks or other frames. For an individual pixel of a macroblock, the visible artifact may be introduced because the macroblock is undecodable and/or because of error propagation. Using H.264/AVC as an example, we illustrate how we estimate the overall visible artifact level considering both initial artifacts and propagated artifacts.

We denote the artifact level of a pixel as $d_{n,x,y}$, where n is the frame index, (x,y) is the pixel's coordinate in the frame. $d_{n,x,y}$ may be initially set to 0. In one embodiment, $d_{n,x,y}$ may be calculated as follows:

$$d_{n,x,y} = \min(255, \max(d_{n-k,x',y'}, \text{LoVA}_{init}(n, x/16, y/16))), \quad (15)$$

where $d_{n-k,x',y'}$ is the propagated visible artifact for pixel (n,x,y), and can be estimated as the artifact level at reference pixel (n−k,x',y') of the current pixel. That is, how the artifact level propagates may be traced through motion vectors. To simplify the computation, we may use the artifact level at the reference pixel at an integer-pixel precision rather than at a fractional-pixel precision. The constants (i.e., 255 and 16) used in Eq. (15) may be adapted when other artifact scale or block size is used. The min(.) or max(.) function may also be replace by other functions, for example, as a product or a weighted sum of $d_{n-k,x',y'}$ and $\text{LoVA}_{init}(n, x/16, y/16)$.

In Eq. (15), the artifact levels of pixels in a reference frame ($d_{n-k,x',y'}$) is used for estimating the artifact levels of pixels in a current frame. When a reference frame (for example, I, P, or reference B frame) is entirely lost, the artifact levels of pixels in the reference frame may not be available and we may use an adjacent available reference frame for estimation.

After the artifact level for pixels are estimated, the overall visible artifact level for an individual macroblock in a frame may be estimated by averaging the artifact levels of the pixels in the macroblock:

$$LoVA(n, i, j) = \max\left(0, \frac{1}{256} \sum_{x=i\times16}^{(i+1)\times16} \sum_{y=j\times16}^{(j+1)\times16} d_{n,x,y}\right). \quad (16)$$

In this process, averaging the pixel artifacts level and clipping operation play a role of spatial clustering to some extent.

It is known that the perceived strength of artifacts also depends on the property of human visual system. As disclosed in a commonly owned PCT application, entitled "Perceived Video Quality Estimation Considering Visual Attention" by X. Gu, D. Liu, and Z. Chen (PCT/CN2012/074527), the teachings of which are specifically incorporated herein by reference, the artifact level for a macroblock may be weighted by a vision sensitivity factor to more accurately estimate the perceived artifact strength.

Given estimated artifact levels at a macroblock level, a spatio-temporal pooling may be operated using a logarithmic function to generate a slicing artifact level for the video sequence as follows:

$$LoVA_{seq} = \log_{10}((\Sigma_n LoVA(n))/F_{fps} + 1), \quad (17)$$

wherein $F_{fps}$ is the frame rate. The artifact level calculated from Eq. (17) can then be mapped into a quality metric corresponding to slicing artifact, for example, as follows:

$$Q_s = C_1 \times LoVA_{seq}^2 + C_2 \times LoVA_{seq} + C_3, \quad (18)$$

wherein $C_1$, $C_2$, and $C_3$ are constants and they may be trained on samples that have slicing artifacts only, that is, the influence of coding artifacts on perceptual quality almost equals zero. This may be performed by selecting the sample whose $Q_c$ (estimated quality corresponding to compression artifacts) is larger than a threshold value, for example, 3.5 in one exemplary implementation.

Figure 4:
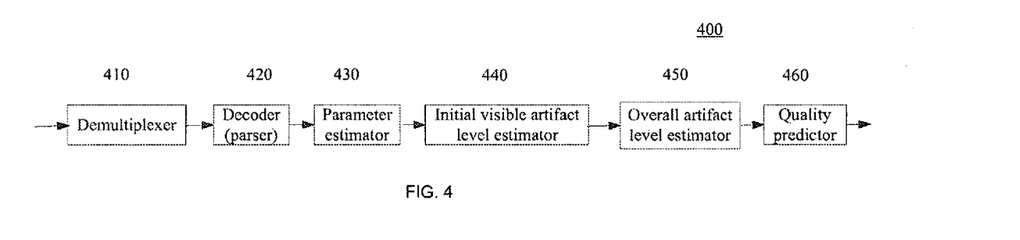
FIG. 4 is a block diagram depicting an example of a video quality monitor, in accordance with an embodiment of the present principles.

Based on the estimated quality corresponding to slicing artifacts, $Q_s$, an overall visual quality metric for the video sequence corresponding to the input bitstream can be estimated. Other types of artifacts, for example, freezing artifact and compression artifacts may be considered when generating the overall visual quality metric for the video sequence:

The present principles may be used in a video quality monitor to measure video quality. FIG. 4 depicts a block diagram of an exemplary video quality monitor 400. The input of apparatus 400 may include a transport stream that contains the bitstream. The input may be in other formats that contains the bitstream.

Demultiplexer 410 obtains packet layer information, for example, number of packets, number of bytes, and frame sizes, from the bitstream. Decoder 420 parses the input stream to obtain more information, for example, frame type, prediction residuals, and motion vectors. Decoder 420 may or may not reconstruct the pictures. In other embodiments, the decoder may perform the functions of the demultiplexer.

Using the decoded information, the parameters needed for artifact level estimation, for example, motion magnitude, residual energy, and error concealment distance, are estimated in parameter estimator 430. Based on the estimated parameters, initial visible artifact levels for individual macroblocks are estimated at initial visible artifact level estimator 440, for example, using method 120. Considering the initial artifacts and error propagation, the overall artifact levels for individual macroblocks are estimated at overall artifact level estimator 450. A quality predictor 460 then pools the macroblock level artifact levels into a quality score. The quality predictor 460 may consider other types of artifacts and the property of human visual property.

The video quality monitor 400 may be used, for example, in ITU-T P.NBAMS standard, which works on video quality assessment models in two application scenarios, namely, IPTV and mobile video streaming, also called HBR scenario and LBR scenario respectively. The difference between the two scenario ranges from the spatio-temporal resolution of video content and coding configuration to transport protocols and viewing conditions.

The input to the P.NBAMS VQM (Video Quality Model) is coded video bitstream with all transmission packet headers (UDP/IP/RTP or UDP/IP/RTP/TS). The output is an objective MOS score. To be embedded in a set-top box (STB) or gateway to monitor video quality is a major target application of P.NBAMS work. P.NBAMS mode 1 model only uses bitstream information by parsing the H.264 syntax, and Mode 2 model may decode parts or all of the video sequence, and the pixel information is used for visual quality prediction in addition to parsing the bitstream information in order to improve the prediction accuracy.

Figure 5:
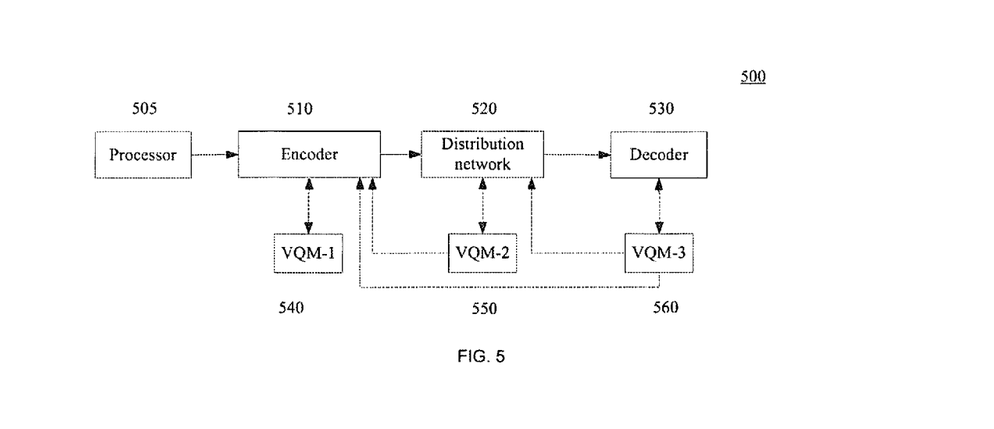
FIG. 5 is a block diagram depicting an example of a video processing system that may be used with one or more implementations.

Referring to FIG. 5, a video transmission system or apparatus 500 is shown, to which the features and principles described above may be applied. A processor 505 processes the video and the encoder 510 encodes the video. The bitstream generated from the encoder is transmitted to a decoder 530 through a distribution network 520. A video quality monitor may be used at different stages.

In one embodiment, a video quality monitor 540 may be used by a content creator. For example, the estimated video quality may be used by an encoder in deciding encoding parameters, such as mode decision or bit rate allocation. In another example, after the video is encoded, the content creator uses the video quality monitor to monitor the quality of encoded video. If the quality metric does not meet a pre-defined quality level, the content creator may choose to re-encode the video to improve the video quality. The content creator may also rank the encoded video based on the quality and charges the content accordingly.

In another embodiment, a video quality monitor 550 may be used by a content distributor. A video quality monitor may be placed in the distribution network. The video quality monitor calculates the quality metrics and reports them to the content distributor. Based on the feedback from the video quality monitor, a content distributor may improve its service by adjusting bandwidth allocation and access control.

The content distributor may also send the feedback to the content creator to adjust encoding. Note that improving encoding quality at the encoder may not necessarily improve the quality at the decoder side since a high quality encoded video usually requires more bandwidth and leaves less bandwidth for transmission protection. Thus, to reach an optimal quality at the decoder, a balance between the encoding bitrate and the bandwidth for channel protection should be considered.

In another embodiment, a video quality monitor 560 may be used by a user device. For example, when a user device searches videos in Internet, a search result may return many videos or many links to videos corresponding to the requested video content. The videos in the search results may have different quality levels. A video quality monitor can calculate quality metrics for these videos and decide to select which video to store. In another example, the user device may have access to several error concealment techniques. A video quality monitor can calculate quality metrics for different error concealment techniques and automatically choose which concealment technique to use based on the calculated quality metrics.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for estimating visual quality of a video sequence represented by a bitstream, wherein slicing mode error concealment is used to conceal undecodable blocks in the video sequence, comprising:
   determining a magnitude of a motion vector of a block, in a frame of the video sequence, that is undecodable;
   determining a distance between the frame and another frame that is used to conceal the block, wherein the magnitude of the motion vector and the distance are estimated at a bitstream level;
   determining an initial visible artifact level in response to a product of the magnitude of the motion vector and the distance; and
   estimating the visual quality of the video sequence in response to the initial visible artifact level.

2. The method of claim 1, further comprising:
   estimating residual energy of the block, wherein the initial visible artifact level is determined further in response to the residual energy.

3. The method of claim 2, wherein the initial visible artifact level is determined in response to a smaller one of (1) a function of the motion magnitude and the distance and (2) another function of the residual energy, wherein the function of the motion magnitude and the distance is an increasing function of the product of the motion magnitude and the distance, and wherein the function of the residual energy is an increasing function of the residual energy.

4. The method of claim 2, wherein the determining an initial visible artifact level is responsive to only a function of the motion magnitude and the distance for a high bitrate application, and is responsive to both (1) the function of the motion magnitude and the distance and (2) another function of the residual energy for a low bitrate application.

5. The method of claim 1, further comprising:
determining a propagated visible artifact level for a pixel in the block in response to an artifact level for a pixel in another block that is used as a reference block for the block;
determining an artifact level for the pixel in the block in response to the propagated visible artifact level for the pixel in the block; and
estimating an overall visible artifact level for the block in response to the artifact level for the pixel in the block, wherein the visual quality of the video sequence is estimated in response to the overall visible artifact level for the block.

6. The method of claim 5, wherein the overall visible artifact level for the block is estimated in response to an average of artifact levels for pixels in the block.

7. The method of claim 5, wherein the determining the artifact level for the pixel in the block is further in response to the initial visible artifact level for the block.

8. The method of claim 7, wherein the artifact level for the pixel in the block is determined in response to a greater one of the initial visible artifact level and the propagated visible artifact level.

9. An apparatus for estimating visual quality of a video sequence represented by a bitstream, wherein slicing mode error concealment is used to conceal undecodable blocks in the video sequence, comprising at least a memory and one or more processors, the one or more processors configured to:
determine a magnitude of a motion vector of an undecodable block in a frame of the video sequence, and a distance between the frame and another frame that is used to conceal the undecodable block wherein the magnitude of the motion vector and the distance are determined at a bitstream level;
determine an initial visible artifact level in response to a product of the magnitude of the motion vector and the distance; and
estimate the visual quality of the video sequence in response to the initial visible artifact level.

10. The apparatus of claim 9, wherein the one or more processors are further configured to estimate residual energy of the block, and to determine the initial visible artifact level further in response to the residual energy.

11. The apparatus of claim 10, wherein the one or more processors are configured to determine the initial visible artifact level in response to a smaller one of (1) a function of the motion magnitude and the distance and (2) another function of the residual energy, wherein the function of the motion magnitude and the distance is an increasing function of the product of the motion magnitude and the distance, and wherein the function of the residual energy is an increasing function of the residual energy.

12. The apparatus of claim 10, wherein the one or more processors are configured to determine the initial visible artifact level only responsive to a function of the motion magnitude and the distance for a high bitrate application, and responsive to both (1) the function of the motion magnitude and the distance and (2) another function of the residual energy for a low bitrate application.

13. The apparatus of claim 9, wherein the one or more processors are further
configured to determine a propagated visible artifact level for a pixel in the block in response to an artifact level for a pixel in another block that is used as a reference block for the block, to determine an artifact level for the pixel in the block in response to the propagated visible artifact level for the pixel in the block, and to estimate an overall visible artifact level for the block in response to the artifact level for the pixel in the block.

14. The apparatus of claim 13, wherein the one or more processors are configured to estimate the overall visible artifact level for the block in response to an average of artifact levels for pixels in the block.

15. The apparatus of claim 13, wherein the artifact level for the pixel in the block is further determined in response to the initial visible artifact level for the block.

16. The apparatus of claim 15, wherein the one or more processors are configured to determine the artifact level for the pixel in the block in response to a greater one of the initial visible artifact level and the propagated visible artifact level.

* * * * *